US011818451B2

(12) United States Patent
Lee et al.

(10) Patent No.: US 11,818,451 B2
(45) Date of Patent: Nov. 14, 2023

(54) OPTICAL DEVICE HAVING CAMERA AND MULTI-CHANNEL LENS AND METHOD OF CONTROLLING OPTICAL DEVICE

(71) Applicant: Samsung Display Co., LTD., Yongin-si (KR)

(72) Inventors: Ji Won Lee, Suwon-si (KR); Sang Ho Kim, Gwangmyeong-si (KR); Soo Min Baek, Hwaseong-si (KR); Cheon Myeong Lee, Seoul (KR); Ju Hwa Ha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/656,559

(22) Filed: Mar. 25, 2022

(65) Prior Publication Data
US 2022/0321749 A1 Oct. 6, 2022

(30) Foreign Application Priority Data

Mar. 31, 2021 (KR) ........................ 10-2021-0041720

(51) Int. Cl.
| H04N 5/335 | (2011.01) |
| H04N 23/57 | (2023.01) |
| G02B 3/08 | (2006.01) |
| G02B 27/00 | (2006.01) |
| H04N 23/55 | (2023.01) |
| H04N 23/56 | (2023.01) |
| G06F 3/01 | (2006.01) |
| H04N 23/90 | (2023.01) |

(52) U.S. Cl.
CPC ............. *H04N 23/57* (2023.01); *G02B 3/08* (2013.01); *G02B 27/0093* (2013.01); *H04N 23/55* (2023.01); *H04N 23/56* (2023.01); *G06F 3/013* (2013.01); *H04N 23/90* (2023.01)

(58) Field of Classification Search
CPC .................................................. G02B 27/0093
See application file for complete search history.

(56) References Cited

U.S. PATENT DOCUMENTS

| 2015/0288944 A1* | 10/2015 | Nistico ...................... G06T 7/70 |
| | | 345/156 |
| 2017/0282062 A1 | 10/2017 | Black |
| 2018/0003862 A1* | 1/2018 | Benitez ............. G02B 27/0172 |
| 2019/0155037 A1 | 5/2019 | Matsumura et al. |
| 2019/0293930 A1 | 9/2019 | Zhang et al. |
| 2022/0221721 A1* | 7/2022 | Kim ......................... H04N 5/33 |

FOREIGN PATENT DOCUMENTS

| KR | 2017-0039622 A | 4/2017 |
| KR | 2017-0082394 A | 7/2017 |

* cited by examiner

*Primary Examiner* — Gary C Vieaux
(74) *Attorney, Agent, or Firm* — Lewis Roca Rothgerber Christie LLP

(57) ABSTRACT

An optical device includes: a display device configured to display an image; a camera mounting component on the display device; a camera on the camera mounting component; and a multi-channel lens on the camera covering the camera and the camera mounting component, wherein the camera comprises an image sensor.

19 Claims, 14 Drawing Sheets (a)

(b)

(c)

OPTICAL DEVICE HAVING CAMERA AND MULTI-CHANNEL LENS AND METHOD OF CONTROLLING OPTICAL DEVICE

CROSS-REFERENCE TO RELATED APPLICATION

The present application claims priority to and the benefit of Korean Patent Application No. 10-2021-0041720 filed on Mar. 31, 2021, in the Korean Intellectual Property Office (KIPO), the entire content of which is incorporated herein by reference.

BACKGROUND

1. Field

Aspects of some embodiments of the present disclosure relate to an optical device, and a method of controlling the optical device.

2. Description of the Related Art

Among optical devices, there are electronic devices that can be worn on a person's body. Such electronic devices are typically referred to as wearable devices. A wearable electronic device can be worn directly on a person's body, and thus portability and user accessibility can be improved.

An example of such wearable electronic devices may include a head mounted display (head mounted electronic device) that can be mounted or worn on a person's head. Head mounted displays (HMD) may include a see-through head mounted display which provides augmented reality (AR) and a non-see-through head mounted display which provides virtual reality (VR).

The above information disclosed in this Background section is only for enhancement of understanding of the background and therefore the information discussed in this Background section does not necessarily constitute prior art.

SUMMARY

Aspects of some embodiments of the present disclosure provide a compact optical device.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to some embodiments of the present disclosure, there is provided an optical device including a display device configured to display an image, a camera mounting member on the display device, a camera on the camera mounting member, and a multi-channel lens on the camera to cover the camera and the camera mounting member. The camera may include an image sensor.

According to some embodiments, the camera mounting member may include a support ring, a plurality of legs connected to the support ring, and a camera mount connected to the plurality of legs.

According to some embodiments, the plurality of legs and the camera mount may be on an inner side of the support ring in a plan view.

According to some embodiments, one side of each of the plurality of legs may be connected to the support ring, and an opposite side of each of the plurality of legs is connected to the camera mount.

According to some embodiments, the plurality of legs and the camera mount may protrude from the support ring toward the multi-channel lens.

According to some embodiments, the optical device may further include a camera connection wire on one of the plurality of legs and connected to the camera.

According to some embodiments, the camera mount may overlap a center of the multi-channel lens in a plan view.

According to some embodiments, the camera may be between the camera mount and the multi-channel lens.

According to some embodiments, the multi-channel lens may include a concave rear surface facing the display device, and wherein the camera is accommodated in a space between the rear surface of the multi-channel lens and the camera mount.

According to some embodiments, the multi-channel lens may include a plurality of subsidiary lenses providing a plurality of channels, respectively. The legs may overlap boundaries between the subsidiary lenses, respectively.

According to some embodiments, the subsidiary lenses may refract and reflect lights output from different regions of the display device, respectively.

According to some embodiments, a number of the plurality of legs may be equal to or less than a number of the plurality of subsidiary lenses.

According to some embodiments, the light output from the display device may pass between the plurality of legs.

According to some embodiments, the camera may include a light source for emitting light.

According to some embodiments, the camera may receive light that is emitted from the light source and reflected off the user's pupil.

According to some embodiments, the optical device may further include a light source for emitting light, wherein the light source is on an outer surface of the multi-channel lens.

According to some embodiments, a position of a user's pupil may be detected based on the light received by the camera.

According to some embodiments of the present disclosure, there is provided a method for controlling an optical device includes a display device configured to display an image, a multi-channel lens above the display device and comprising a front surface facing a user's eye and a concave rear surface facing the display device, a camera mounting member at least partially accommodated in an internal space between the rear surface of the multi-channel lens and the display device, and a camera on the camera mounting member to face the rear surface of the multi-channel lens.

According to some embodiments, the camera mounting member may include a support ring, a plurality of legs connected to the support ring, and a camera mount connected to the plurality of legs.

According to some embodiments, the multi-channel lens may include a plurality of subsidiary lenses providing a plurality of channels, respectively, and wherein the legs overlap boundaries between the subsidiary lenses, respectively.

According to the aforementioned and other embodiments of the present disclosure, the volume of an optical device to can be reduced, and the internal space of the optical device can be utilized relatively more efficiently.

BRIEF DESCRIPTION OF THE DRAWINGS

The above and other embodiments and features of embodiments according to the present disclosure will become more apparent by describing aspects of some embodiments thereof with reference to the attached drawings, in which.

DETAILED DESCRIPTION

Figure 1:
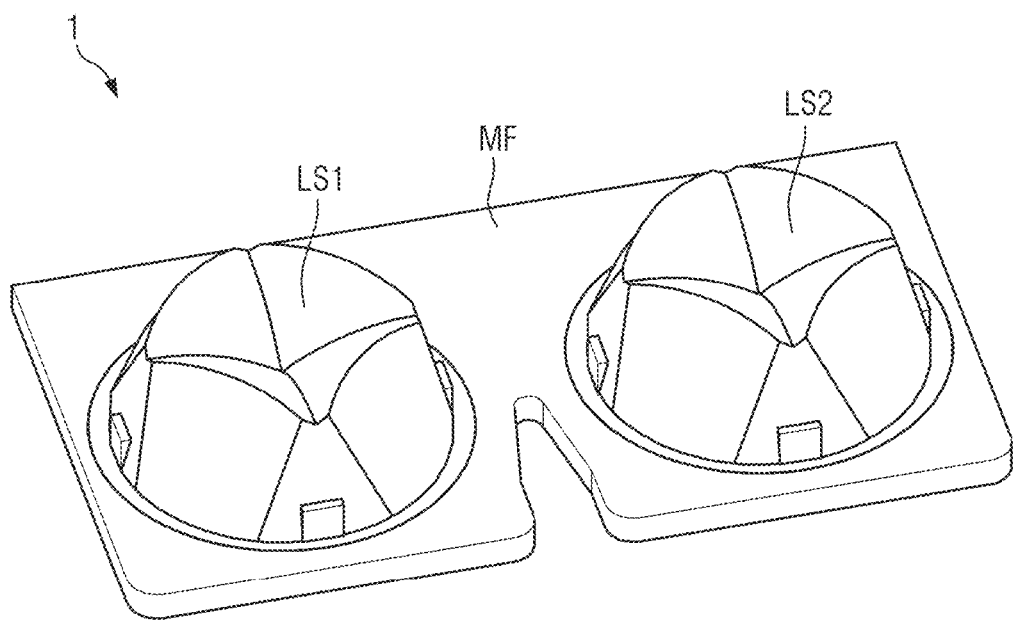
FIG. 1 is a perspective view of an optical device according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of some embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on,"

"connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of some embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
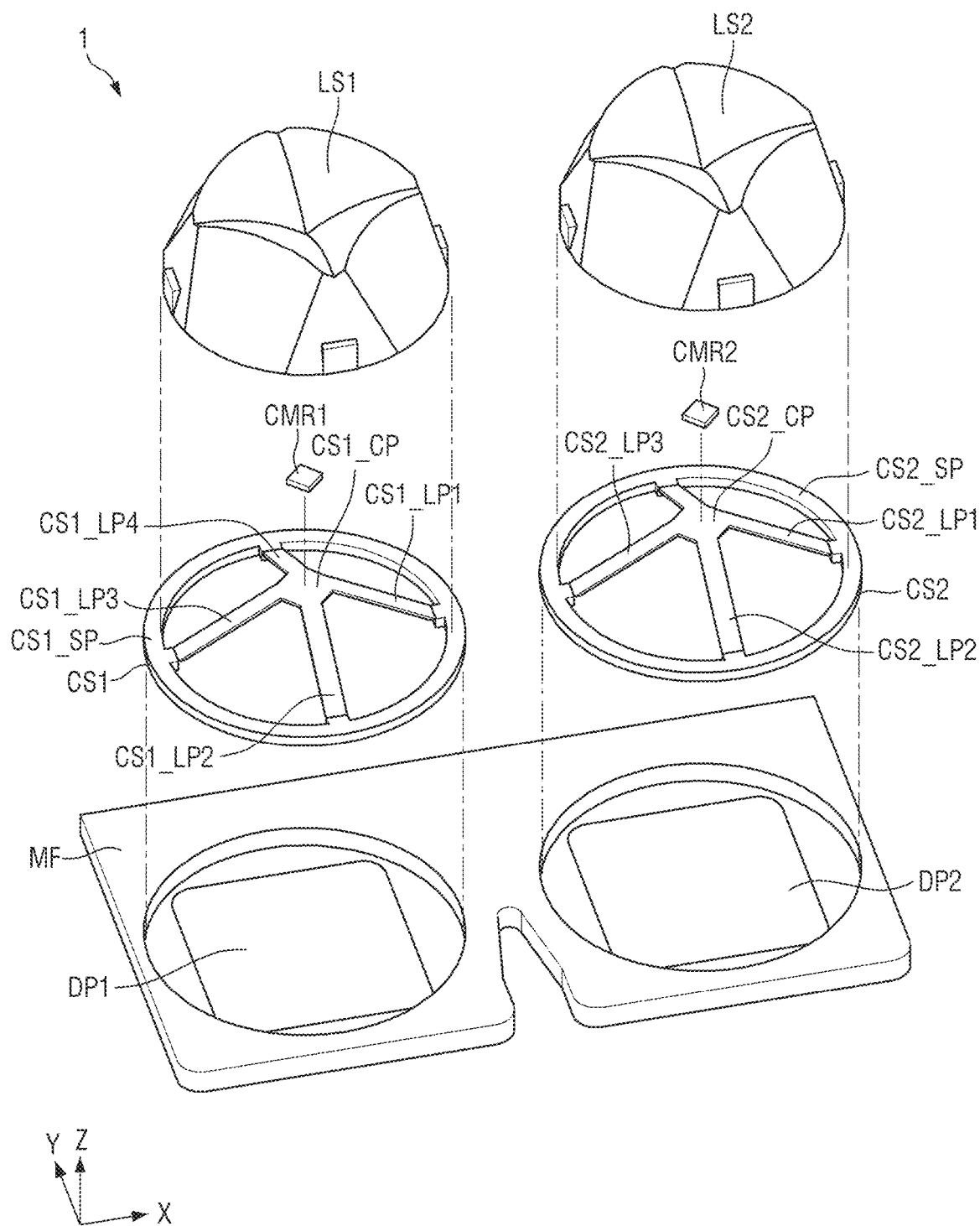
FIG. 2 is an exploded, perspective view of an optical device according to some embodiments of the present disclosure.

FIG. 1 is a perspective view of an optical device according to some embodiments of the present disclosure. FIG. 2 is an exploded, perspective view of an optical device according to some embodiments of the present disclosure.

In the following description, a first direction X, a second direction Y and a third direction Z are different directions and cross one another. For example, the first direction X may be a longitudinal direction, the second direction Y may be a width direction, and the third direction Z may be a thickness direction. The third direction Z may include the side on which the user's eyeballs are located and the side on which images of first and second display devices DP1 and DP2 are displayed, which will be described in more detail later. It is to be noted that the directions and names are relative and are not limited by those described above.

In the following description, the optical device 1 may include a head mounted optical device mounted on a user's head (or configured to be mounted on a user's head) to provide a screen on which images or videos are displayed to the user.

Head mounted optical devices may include a see-through head mounted optical device that provides augmented reality based on actual external objects, and a see-closed (or non-see-through) head mounted optical device that provides virtual reality to a user using a screen independent of external objects. In the following description, a see-closed head mounted optical device will be described as an example. It should be understood that embodiments according to the present disclosure are not limited thereto.

Referring to FIGS. 1 and 2, the optical device 1 may include a main frame MF, a first display device DP1, a second display device DP2, a first multi-channel lens LS1, and a second multi-channel lens LS2, a first camera mounting member (or first camera mounting component, or first camera mounting structure) CS1, a second camera mounting member (or second camera mounting component, or second camera mounting structure) CS2, a first camera CMR1, and a second camera CMR2.

The main frame MF may be worn on a user's face. The main frame MF may have a shape conforming to the shape of the user's head (face). According to some embodiments of the present disclosure, the main frame MF may have a shape similar to glasses, but embodiments according to the present disclosure are not limited thereto.

The first display device DP1, the second display device DP2, the first multi-channel lens LS1, the second multi-channel lens LS2, the first camera mounting member CS1, the second camera mounting member CS2, the first camera CMR1 and the second camera CMR2 may be mounted on the main frame MF. According to some embodiments, the main frame MF may further include a structure such as a strap and a band for easy mounting. According to some embodiments, a controller, an image processor, and a lens receiver may be further mounted on the main frame MF.

The first display device DP1 and the second display device DP2 display images and/or videos. Lights for displaying images and/or videos can be output from the first display device DP1 and the second display device DP2.

The first display device DP1 and the second display device DP2 may be fixed to the main frame MF or may be detachably connected to it. The first display device DP1 and the second display device DP2 may be opaque, transparent or translucent depending on the design of the optical device 1, for example, the type of the optical device 1. The first display device DP1 and the second display device DP2 may include, but is not limited to, an optical device including an electronic component such as a display module including a display panel to be described later or a mobile terminal including a display panel.

Each of the first display device DP1 and the second display device DP2 may include a display panel for displaying images or videos.

The display panel may be a light-emitting display panel including light-emitting elements. For example, the display panel may include, but is not limited to, an organic light-emitting display panel using organic light-emitting diodes including organic emissive layer, a micro light-emitting diode display panel using micro LEDs, a quantum-dot light-emitting display panel including quantum-dot light-emitting diodes including an quantum-dot emissive layer, or an inorganic light-emitting display panel using inorganic light-emitting elements including an inorganic semiconductor.

According to some embodiments of the present disclosure, the optical device 1 may include, but is not limited to, two display devices spaced apart from each other so that they correspond to the user's eyes, respectively. According to some embodiments, the first display device DP1 and the second display device DP2 may be replaced with the first multi-channel lens LS1, the second multi-channel lens LS2, and one display device arranged to overlap the first multi-channel lens LS1 and the second multi-channel lens LS2.

The first multi-channel lens LS1 and the second multi-channel lens LS2 may transmit the lights output from the first display device DP1 and the second display device DP2, respectively, to provide them to the user.

The first multi-channel lens LS1 and the second multi-channel lens LS2 may reflect and/or refract the lights output from the first display device DP1 and the second display device DP2 to provide them to the user. The first multi-channel lens LS1 and the second multi-channel lens LS2 may provide a plurality of channels through which the lights emitted from the first display device DP1 and the second display device DP2 pass. The plurality of channels may pass the lights output from the first display device DP1 and the second display device DP2 through different paths to provide them to the user. The lights output from the first display device DP1 and the second display device DP2 may be incident on the respective channels, so that a magnified image may be focused on the user's eyes. The plurality of channels may be implemented by a plurality of subsidiary lenses LS11, LS12, LS13, LS14, LS21, LS22, LS23 and LS24 (see FIG. 3), which will be described in more detail later.

The first multi-channel lens LS1 may be located above the first display device DP1, and the second multi-channel lens LS2 may be arranged above the second display device DP2. The first multi-channel lens LS1 and the second multi-channel lens LS2 may be located at the positions corresponding to the user's left and right eyes, respectively. The first multi-channel lens LS1 may be arranged to cover the first camera CMR1 and the first camera mounting member CS1. The second multi-channel lens LS2 may be arranged to cover the second camera CMR2 and the second camera mounting member CS2. The first multi-channel lens LS1 and the second multi-channel lens LS2 will be described in detail later with reference to FIGS. 3 to 8.

The first camera mount CS1 and the second camera mount CS2 may be located on the first display device DP1 and the second display device DP2, respectively. The first camera mount CS1 may be located between the first display device DP1 and the first multi-channel lens LS1, and the second camera mount CS2 may be located between the second display device DP2 and the second multi-channel lens LS2. The first camera CMR1 may be mounted on the first camera mount member CS1, and the second camera CMR2 may be mounted on the second camera mount CS1. As the first camera CMR1 and the second camera CMR2 overlap the first multi-channel lens LS1 and the second multi-channel lens LS2 by the first camera mount CS1 and the second camera mount CS2, respectively, the internal space of the first optical device 1 can be efficiently utilized, and the overall volume of the optical device 1 can be reduced.

The first camera CMR1 and the second camera CMR2 may be located on the first camera mount CS1 and the second camera mount CS2, respectively. The first camera CMR1 may be located between the first camera mount CS1 and the first multi-channel lens LS1, and the second camera CMR2 may be located between the second camera mount CS2 and the second multi-channel lens LS2.

The first display device DP1, the first camera mount CS1, the first camera CMR1 and the first multi-channel lens LS1 may be arranged to overlap one another in the third direction Z. The second display device DP2, the second camera mount CS2, the second camera CMR2 and the second multi-channel lens LS2 may be arranged to overlap one another in the third direction Z. The third direction Z may refer to the direction in which the user's eyeballs are located.

The first camera CMR1 and the second camera CMR2 may capture images for detecting the positions of the user's pupils. The first camera CMR1 and the second camera CMR2 include various types of cameras capable of detecting light reflected from the user's pupils, such as an infrared camera and a visible light camera, or a photoelectric conversion element such as an image sensor that detects light and generates an electric charge. According to some embodiments of the present disclosure, the first camera CMR1 and the second camera CMR2 may include, but are not limited to, infrared cameras.

According to some embodiments of the present disclosure, each of the first camera CMR1 and the second camera CMR2 may further include a light source emitting light for detecting the positions of the user's pupils. The light may include visible light or infrared light. According to some embodiments of the present disclosure, the light source may be integrally mounted with each of the first camera CMR1 and the second camera CMR2, but embodiments according to the present disclosure are not limited thereto.

According to some embodiments, the light source may be mounted on the optical device 1 separately from the first camera CMR1 and the second camera CMR2. According to some embodiments, the light sources may be located adjacent to the first camera CMR1 or the second camera CMR2 on a first camera mount CS1_CP or a second camera mount CS2_CP to be described later. It should be understood that the embodiments according to the present disclosure are not limited thereto.

According to some embodiments, the optical device 1 may further include a controller for controlling the overall operation of the optical device 1.

The controller may control operations of the first camera CMR1, the second camera CMR2 and the light sources. The controller may calculate the positions of the user's pupils by analyzing the images captured by the first camera CMR1 and the second camera CMR2. Based on the calculated positions of the user's pupils, the controller may control the first display device DP1 and the second display device DP2 so that they display images corresponding thereto. For example, the controller may be implemented as a dedicated processor including an embedded processor and/or a general-purpose processor including a central processing unit or an application processor. It should be understood that embodiments according to the present disclosure are not limited thereto.

Figure 3:
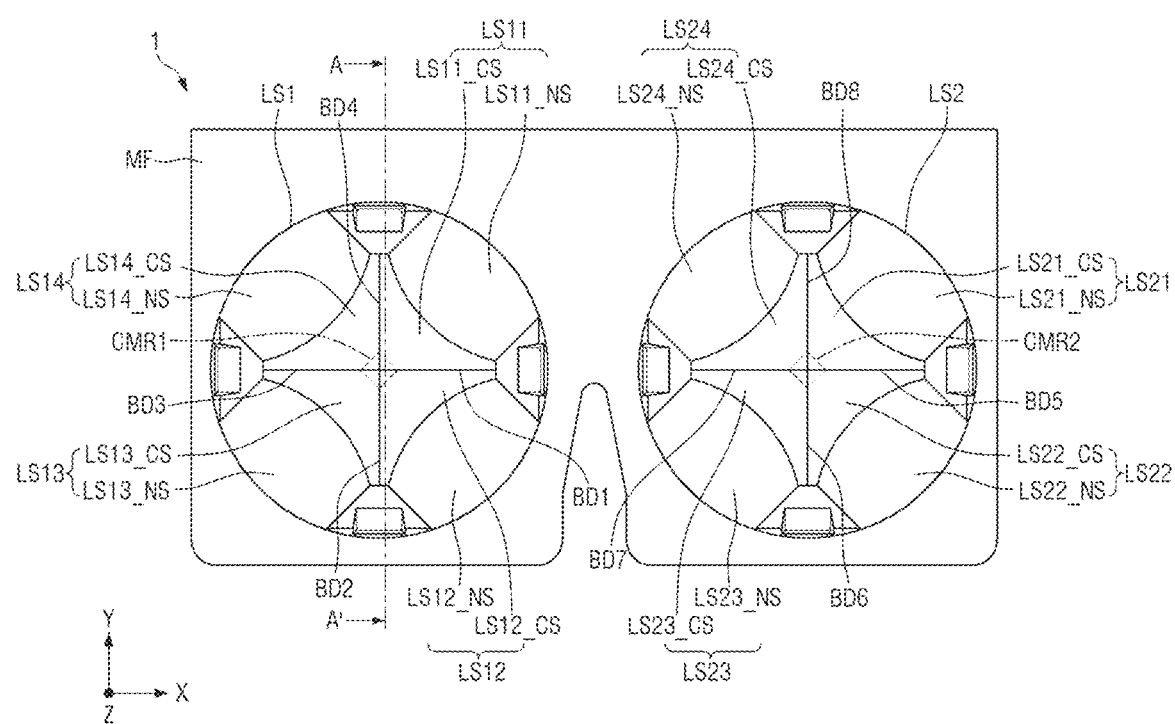
FIG. 3 is a plan view of an optical device according to some embodiments of the present disclosure.
Figure 4:
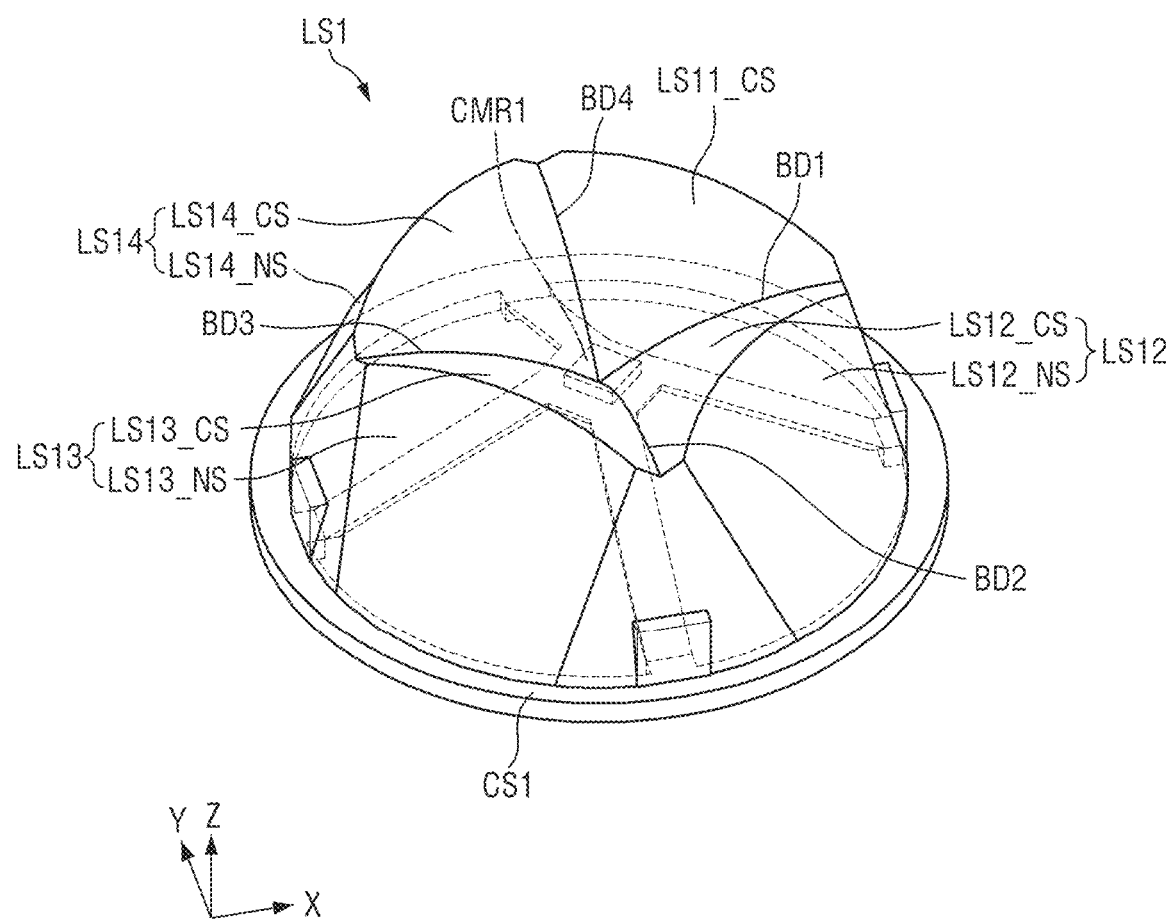
FIG. 4 is a perspective view of a first multi-channel lens according to some embodiments of the present disclosure.
Figure 5:
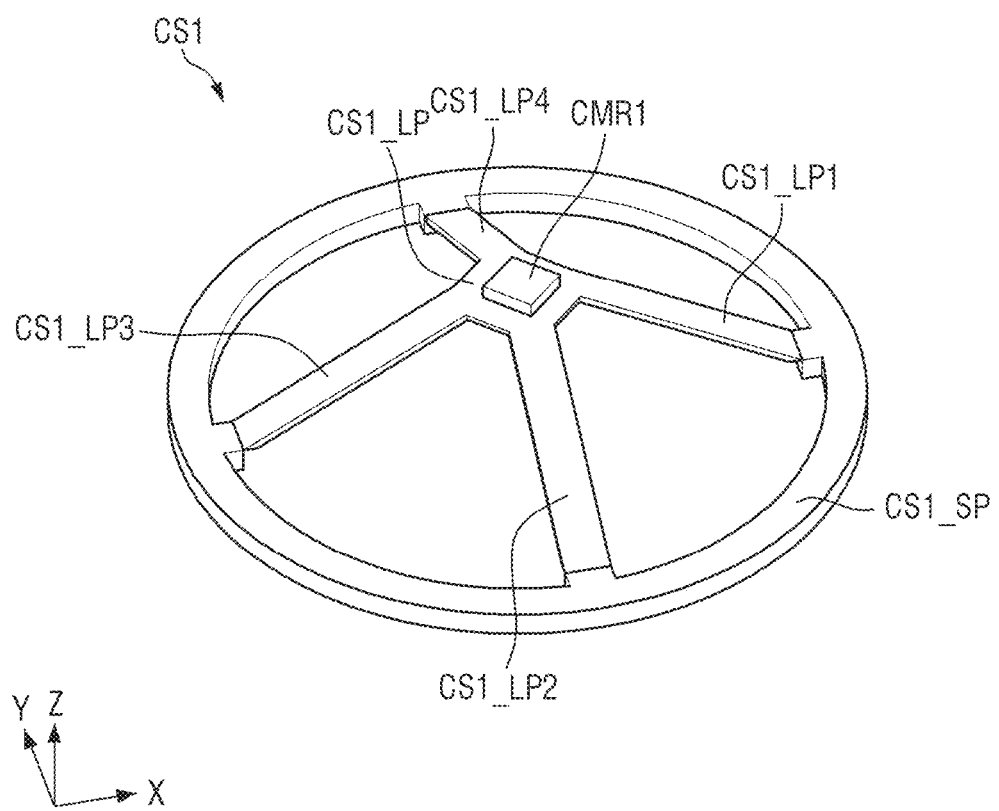
FIG. 5 is a perspective view of a first camera mounting member according to some embodiments of the present disclosure.
Figure 6:
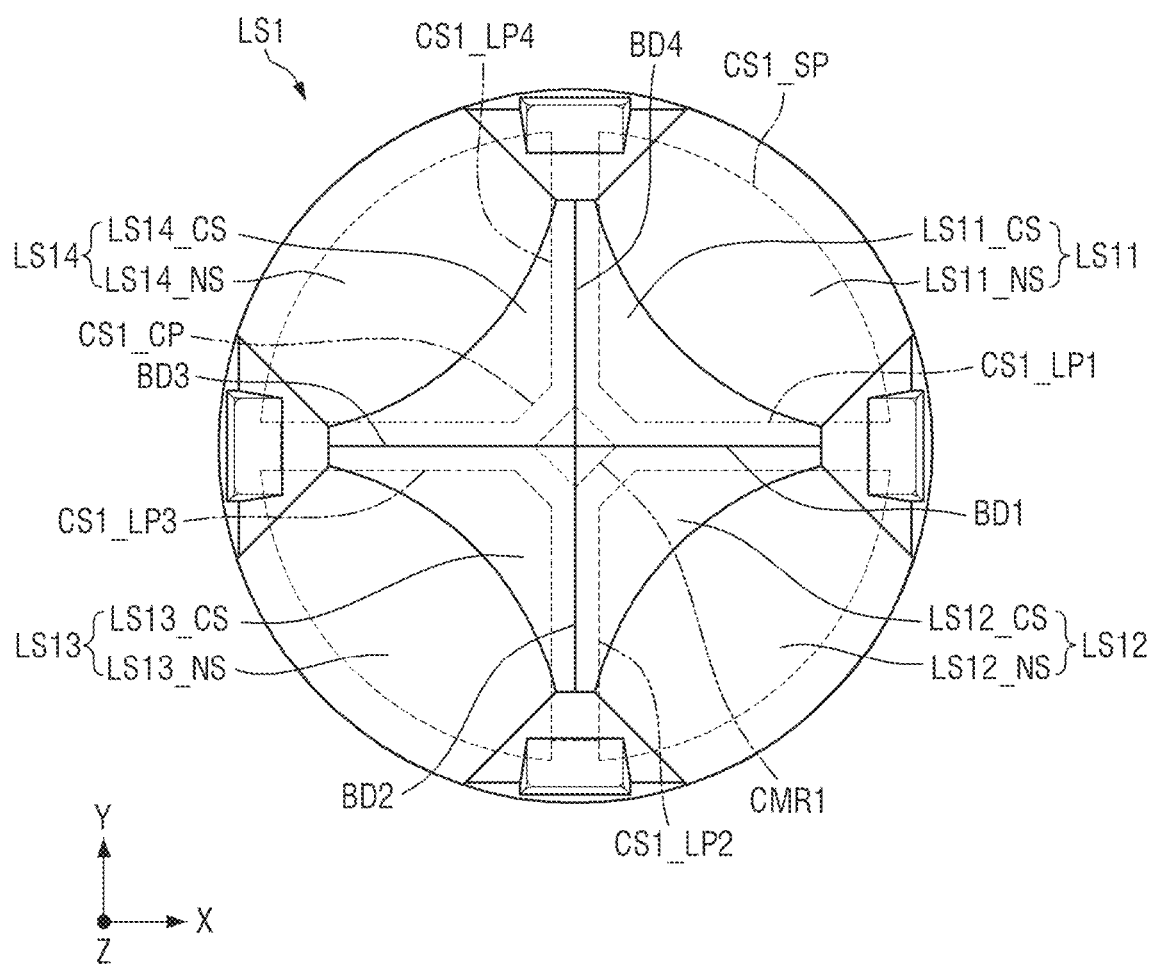
FIG. 6 is a plan view of a first multi-channel lens according to some embodiments of the present disclosure.
Figure 7:
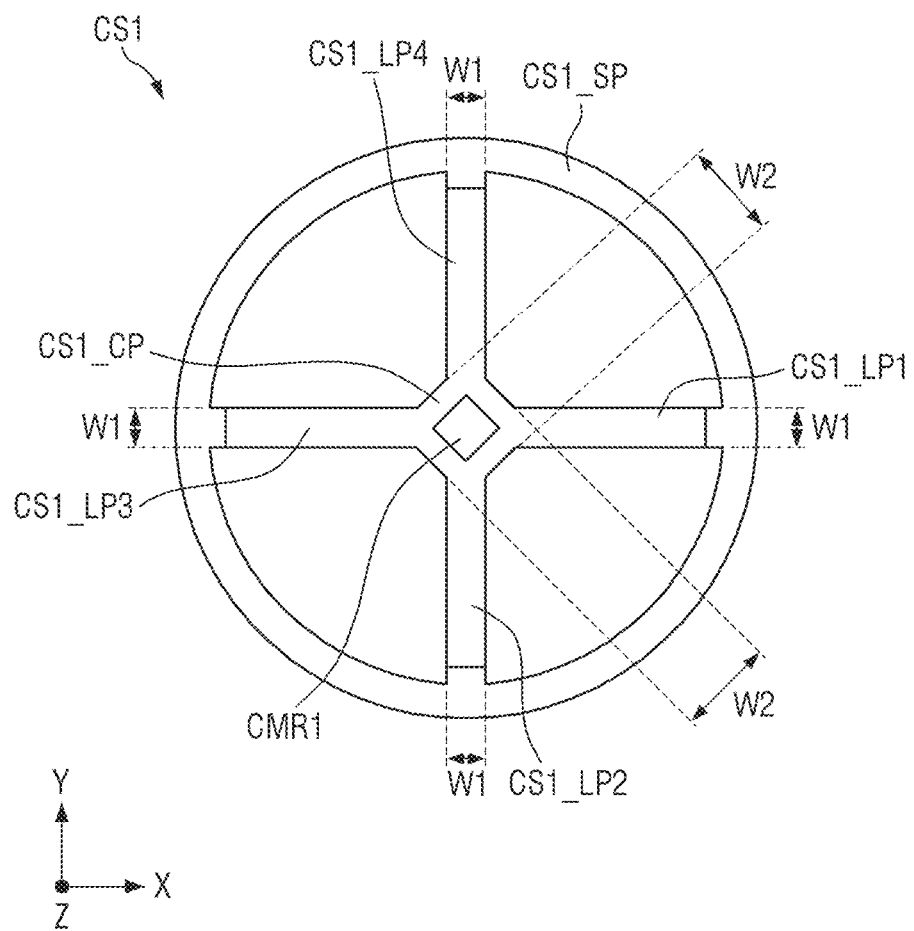
FIG. 7 is a plan view of a first camera mounting member according to some embodiments of the present disclosure.

FIG. 3 is a plan view of an optical device according to some embodiments of the present disclosure. FIG. 4 is a perspective view of a first multi-channel lens according to some embodiments. FIG. 5 is a perspective view of a first camera mounting member according to some embodiments of the present disclosure. FIG. 6 is a plan view of a first multi-channel lens according to some embodiments. FIG. 7 is a plan view of a first camera mounting member according to some embodiments of the present disclosure.

Referring to FIGS. 1 to 3, the first multi-channel lens LS1 and the second multi-channel lens LS2 may be located at positions corresponding to the user's eyes, respectively. For example, the first multi-channel lens LS1 and the second multi-channel lens LS2 may be arranged symmetrically with respect to an imaginary axis passing therebetween in the second direction Y. The first multi-channel lens LS1 and the second multi-channel lens LS2 may have substantially the same or similar shape and structure. The first multi-channel lens LS1 and the second multi-channel lens LS2 may have a generally circular shape when viewed from the top (e.g., in a plan view), but the shape of the first multi-channel lens LS1 and the second multi-channel lens LS2 is not limited thereto.

The first multi-channel lens LS1 may include a plurality of subsidiary lenses LS11, LS12, LS13 and LS14, and the second multi-channel lens LS2 may include a plurality of subsidiary lens LS21, LS22, LS23 and LS24. The plurality of subsidiary lenses LS11, LS12, LS13, LS14, LS21, LS22, LS23 and LS24 may provide a plurality of channels, respectively, through which the lights output from the first display device DP1 and the second display device DP2 pass.

According to some embodiments of the present disclosure, the first multi-channel lens LS1 may include four subsidiary lenses LS11, LS12, LS13 and LS14, and the second multi-channel lens LS2 may include four subsidiary lenses LS21, LS22, LS23 and LS24, but the number of the subsidiary lenses forming a single multi-channel lens is not limited to four. According to some embodiments of the present disclosure, the first multi-channel lens LS1 and the second multi-channel lens LS2 may include three or less subsidiary lenses or five or more subsidiary lenses.

In the following description, for convenience of illustration, with respect to the center of the first multi-channel lens LS1, the subsidiary lens LS11 located at the upper right end is referred to as a first subsidiary lens LS11, the subsidiary lens LS12 located at the lower right end is referred to as a second subsidiary lens LS12, the subsidiary lens LS13 located at the lower left end is referred to as a third subsidiary lens LS13, and the subsidiary lens LS14 located at the upper left end is referred to as a fourth subsidiary lens LS14. In addition, with respect to the center of the second multi-channel lens LS2, the subsidiary lens LS21 located at the upper right end is referred to as a fifth subsidiary lens LS21, the subsidiary lens LS22 located at the lower right end is referred to as a sixth subsidiary lens LS22, the subsidiary lens LS23 located at the lower left end is referred to as a seventh subsidiary lens LS23, and the subsidiary lens LS24 located at the upper left end is referred to as an eighth subsidiary lens LS24.

Referring to FIGS. 1 to 4, the plurality of subsidiary lenses LS11, LS12, LS13 and LS14 of the first multi-channel lens LS1 may be symmetrical with respect to the center of the first multi-channel lens LS1. The plurality of subsidiary lenses LS21, LS22, LS23 and LS24 of the second multi-channel lens LS2 may be symmetrical with respect to the center of the second multi-channel lens LS2. For example, the first subsidiary lens LS11, the second subsidiary lens LS12, the third subsidiary lens LS13 and the fourth subsidiary lens LS14 may have a shape symmetrical with respect to the center of the first multi-channel lens LS1. The fifth subsidiary lens LS21, the sixth subsidiary lens LS22, the seventh subsidiary lens LS23 and the eighth subsidiary lens LS24 may have a shape symmetrical with respect to the center of the second multi-channel lens LS2.

The plurality of subsidiary lenses LS11, LS12, LS13 and LS14 of the first multi-channel lens LS1 may be connected to one another integrally. The plurality of subsidiary lens LS21, LS22, LS23 and LS24 of the second multi-channel lens LS2 may be connected to one another integrally. For example, the first subsidiary lens LS11, the second subsidiary lens LS12, the third subsidiary lens LS13 and the fourth subsidiary lens LS14 may be processed so that they are integrally connected to one another to form the single first multi-channel lens LS1. The fifth subsidiary lens LS21, the sixth subsidiary lens LS22, the seventh subsidiary lens LS23 and the eighth subsidiary lens LS24 may be processed so that they are integrally connected to one another to form the single second multi-channel lens LS2. In other words, a single subsidiary lens may refer to a particular portion or region of the first multi-channel lens LS1 or the second multi-channel lens LS2 which provide a single channel. It should be understood that embodiments according to the present disclosure are not limited thereto. According to some embodiments of the present disclosure, the first multi-channel lens LS1 may be a lens assembly including a plurality of subsidiary lenses LS11, LS12, LS13 and LS14 spaced apart from one another. The second multi-channel lens LS2 may be a lens assembly including a plurality of subsidiary lens LS21, LS22, LS23 and LS24 spaced apart from one another.

Each of the plurality of subsidiary lenses LS11, LS12, LS13, LS14, LS21, LS22, LS23 and LS24 may include at least one outer surface facing the user's eyeballs (i.e., facing a location of where a user's eye would be located when worn by the user).

For example, the first subsidiary lens LS11 may include a first outer surface LS11_NS and a second outer surface LS11_CS, the second subsidiary lens LS12 may include a third outer surface LS12_NS and a fourth outer surface LS12_CS, the third subsidiary lens LS13 may include a fifth outer surface LS13_NS and a sixth outer surface LS13_CS, and the fourth subsidiary lens LS14 may include a seventh outer surface LS14_NS and an eighth outer surface LS14_CS. The fifth subsidiary lens LS21 may include a ninth outer surface LS21_NS and a tenth outer surface LS21_CS, the sixth subsidiary lens LS22 may include an eleventh outer surface LS22_NS and a twelfth outer surface LS22_CS, the seventh subsidiary lens LS23 may include a thirteenth outer surface LS23_NS and a fourteenth outer surface LS23_CS, and the eighth subsidiary lens LS24 may include a fifteenth outer surface LS24_NS and a sixteenth outer surface LS24_CS.

As described above, the second multi-channel lens LS2 may be substantially identical to the first multi-channel lens LS1. According to some embodiments of the present disclosure, the first outer surface LS11_NS, the second outer surface LS11_CS, the third outer surface LS12_NS, the fourth outer surface LS12_CS, the fifth outer surface LS13_NS, the sixth outer surface LS13_CS, the seventh outer surface LS14_NS and the eighth outer surface LS14_CS may be substantially identical to the ninth outer surface LS21_NS, the tenth outer surface LS21_CS, the eleventh outer surface LS22_NS, the twelfth outer surface LS22_CS, the thirteenth outer surface LS23_NS, the fourteenth outer surface LS23_CS, the fifteenth outer surface LS24_NS and the sixteenth outer surface LS24_CS, respectively. Hereinafter, the first outer surface LS11_NS, the second outer surface LS11_CS, the third outer surface LS12_NS, the fourth outer surface LS12_CS, the fifth outer surface LS13_NS, the sixth outer surface LS13_CS, the seventh outer surface LS14_NS and the eighth outer surface LS14_CS will be mainly described.

The first outer surface LS11_NS, the third outer surface LS12_NS, the fifth outer surface LS13_NS and the seventh outer surface LS14_NS may be extended from the edge of the first multi-channel lens LS1 toward the center of the first subsidiary LS11. The first outer surface LS11_NS, the third outer surface LS12_NS, the fifth outer surface LS13_NS and the seventh outer surface LS14_NS may be extended such that they are inclined with respect to the third direction Z. The first outer surface LS11_NS, the third outer surface LS12_NS, the fifth outer surface LS13_NS and the seventh outer surface LS14_NS may be extended so that the width of the first multi-channel lens LS1 in the first direction X or the second direction Y becomes narrow. According to some embodiments of the present disclosure, each of the first outer surface LS11_NS, the third outer surface LS12_NS, the fifth outer surface LS13_NS and the seventh outer surface LS14_NS may be, but is not limited to, a flat inclined surface. According to some embodiments, each of the first outer surface LS11_NS, the third outer surface LS12_NS, the fifth outer surface LS13_NS and the seventh outer surface LS14_NS may include a curved surface.

The second outer surface LS11_CS, the fourth outer surface LS12_CS, the sixth outer surface LS13_CS and the eighth outer surface LS14_CS may be extended from the first outer surface LS11_NS, the third outer surface LS12_NS, the fifth outer surface LS13_NS and the seventh outer surface LS14_NS, respectively, toward the center of the first multi-channel lens LS1. When viewed from the top (or in a plan view), the second outer surface LS11_CS, the fourth outer surface LS12_CS, the sixth outer surface LS13_CS and the eighth outer surface LS14_CS may be arranged to surround the center of the first multi-channel lens LS1. The second outer surface LS11_CS, the fourth outer surface LS12_CS, the sixth outer surface LS13_CS and the eighth outer surface LS14_CS may be arranged so that they are connected with one another in the counter-clockwise direction with respect to the center of the first multi-channel lens LS1.

The second outer surface LS11_CS, the fourth outer surface LS12_CS, the sixth outer surface LS13_CS and the eighth outer surface LS14_CS may be arranged such that they are inclined with respect to the third direction Z. The second outer surface LS11_CS, the fourth outer surface LS12_CS, the sixth outer surface LS13_CS and the eighth outer surface LS14_CS may be arranged such that they are inclined with respect to the first outer surface LS11_NS, the third outer surface LS12_NS, the fifth outer surface LS13_NS and the seventh outer surface LS14_NS, respectively. As shown in FIG. 4, the edge where the first outer surface LS11_NS and the second outer surface LS11_CS are connected with each other, the edge where the third outer surface LS12_NS and the fourth outer surface LS12_CS are connected with each other, the edge where the fifth outer surface LS13_NS and the sixth outer surface LS13_CS are connected with each other, and the edge where the seventh outer surface LS14_NS and the eighth outer surface LS14_CS are connected with each other may protrude in the third direction Z or the outward direction. It should be understood that embodiments according to the present disclosure are not limited thereto.

The second outer surface LS11_CS, the fourth outer surface LS12_CS, the sixth outer surface LS13_CS and the eighth outer surface LS14_CS may be arranged such that they face in the third direction Z. Each of the second outer surface LS11_CS, the fourth outer surface LS12_CS, the sixth outer surface LS13_CS and the eighth outer surface LS14_CS may be referred to as an eye-side surface or a front surface facing the user's eyes. The first outer surface LS11_NS, the third outer surface LS12_NS, the fifth outer surface LS13_NS and the seventh outer surface LS14_NS may be connected to the second outer surface LS11_CS, the fourth outer surface LS12_CS, the sixth outer surface LS13_CS and the eighth outer surface LS14_CS, respectively, and may be referred to as surfaces that do not face the user's eyeballs.

According to some embodiments of the present disclosure, each of the second outer surface LS11_CS, the fourth outer surface LS12_CS, the sixth outer surface LS13_CS and the eighth outer surface LS14_CS may be a convex surface protruding in the third direction Z. It should be understood that embodiments according to the present disclosure are not limited thereto. According to some embodiments, each of the second outer surface LS11_CS, the fourth outer surface LS12_CS, the sixth outer surface LS13_CS and the eighth outer surface LS14_CS may include a flat surface.

At least one lens boundary may be defined between the plurality of subsidiary lenses LS11, LS12, LS13 and LS14 of the first multi-channel lens LS1 and between the plurality of subsidiary lens LS21, LS22, LS23 and LS24 of the second multi-channel lens LS2. For example, when the first multi-channel lens LS1 and the second multi-channel lens LS2 each have four subsidiary lenses (four channels), a lens boundary having a cross-shape may be defined in each of the first multi-channel lens LS1 and the second multi-channel lens LS1 when viewed from the top (or in a plan view). It is, however, to be understood that embodiments according to the present disclosure are not limited thereto. The shape of the lens boundary may be altered depending on the design of the optical device 1.

Referring to FIGS. 3 and 4, the lens boundary of the first multi-channel lens LS1 may include a first lens boundary BD1, a second lens boundary BD2, a third lens boundary BD3 and a fourth lens boundary BD4. The lens boundary of the second multi-channel lens LS2 may include a fifth lens boundary BD5, a sixth lens boundary BD6, a seventh lens boundary BD7 and an eighth lens boundary BD8.

For the first multi-channel lens LS1, the first lens boundary BD1 may be defined between the second outer surface LS11_CS and the fourth outer surface LS12_CS, the second lens boundary BD2 may be defined between the fourth outer surface LS12_CS and the sixth outer surface LS13_CS, the third lens boundary BD3 may be defined between the sixth outer surface LS13_CS and the eighth outer surface LS14_CS, and the fourth lens boundary BD4 may be defined between the eighth outer surface LS14_CS and the second outer surface LS11_CS. As shown in FIG. 4, the first lens boundary BD1, the second lens boundary BD2, the third lens boundary BD3 and the fourth lens boundary BD4 may be, but are not limited to, valleys between the second outer surface LS11_CS, the fourth outer surface LS12_CS, the sixth outer surface LS13_CS and the eighth outer surface LS14_CS. According to some embodiments of the present disclosure, when the first outer surface LS11_NS, the third outer surface LS12_NS, the fifth outer surface LS13_NS and the seventh outer surface LS14_NS are connected with one another, the lens boundaries may further include boundaries between the first outer surface LS11_NS, the third outer surface LS12_NS, the fifth outer surface LS13_NS, and the seventh outer surface LS14_NS.

Likewise, for the second multi-channel lens LS2, the fifth lens boundary BD5 may be defined between the tenth outer surface LS21_CS and the twelfth outer surface LS22_CS, the sixth lens boundary BD6 may be defined between the twelfth outer surface LS22_CS and the fourteenth outer surface LS23_CS, the seventh lens boundary BD7 may be defined between the fourteenth outer surface LS23_CS and the sixteenth outer surface LS24_CS, and the eighth lens boundary BD8 may be defined between the sixteenth outer surface LS24_CS and the tenth outer surface LS21_CS. The fifth lens boundary BD5, the sixth lens boundary BD6, the seventh lens boundary BD7 and the eighth lens boundary BD8 may be substantially identical to the first lens boundary BD1, the second lens boundary BD2, the third lens boundary BD3 and the fourth lens boundary BD4.

Referring to FIGS. 1, 2, 4 and 5, the first camera mounting member CS1 may include a support ring CS1_SP, a plurality of legs CS1_LP1, CS1_LP2, CS1_LP3 and CS1_LP4, and a camera mount CS1_CP.

According to some embodiments of the present disclosure, the support ring CS1_SP, the plurality of legs CS1_LP1, CS1_LP2, CS1_LP3 and CS1_LP4, and the camera mount CS1_CP may be integrally formed. That is to say, the support ring CS1_SP, the plurality of legs CS1_LP1, CS1_LP2, CS1_LP3 and CS1_LP4 and the camera mount CS1_CP may mean a particular portion or a particular region of the first camera mounting member CS1. It should be understood that embodiments according to the present disclosure are not limited thereto. The support ring CS1_SP, the plurality of legs CS1_LP1, CS1_LP2, CS1_LP3 and CS1_LP4, and the camera mount CS1_CP may be implemented as separated elements.

The support ring CS1_SP may be connected to the plurality of legs CS1_LP1, CS1_LP2, CS1_LP3 and CS1_LP4, and may support the plurality of legs CS1_LP1, CS1_LP2, CS1_LP3 and CS1_LP4. According to some embodiments of the present disclosure, the support ring CS1_SP may be implemented as a ring-shaped member conforming to the edge shape of the first multi-channel lens LS1, and the edge of the first multi-channel lens LS1 may be mounted on and supported by the support ring CS1_SP. It should be understood that embodiments according to the present disclosure are not limited thereto. The support ring CS1_SP may have a variety of shapes for supporting the plurality of legs CS1_LP1, CS1_LP2, CS1_LP3 and CS1_LP4, and the first multi-channel lens LS1, such as a rectangle, a square and an oval. According to some embodiments, the support ring CS1_SP may be replaced with a plurality of members arranged in the plurality of legs CS1_LP1, CS1_LP2, CS1_LP3 and CS1_LP4, respectively, to support them.

The plurality of legs CS1_LP1, CS1_LP2, CS1_LP3 and CS1_LP4 may be located on the inner side of the support ring CS1_SP. One side of each of the plurality of legs CS1_LP1, CS1_LP2, CS1_LP3 and CS1_LP4 may be connected to the support ring CS1_SP, and the other side of each of the plurality of legs CS1_LP1, CS1_LP2, CS1_LP3 and CS1_LP4 may be connected to the camera mount CS1_CP. The plurality of legs CS1_LP1, CS1_LP2, CS1_LP3 and CS1_LP4 may be extended such that they are inclined with respect to the third direction Z. The other side of each of the plurality of legs CS1_LP1, CS1_LP2, CS1_LP3 and CS1_LP4 and the camera mount CS1_CP connected thereto may protrude in the third direction Z than the support ring CS1_SP.

The camera mount CS1_CP may be located on the inner side of the support ring CS1_SP to support the first camera CMR1. The camera mount CS1_CP may be arranged to overlap the center of the first multi-channel lens LS1. The camera mount CS1_CP may be supported by the plurality of legs CS1_LP1, CS1_LP2, CS1_LP3 and CS1_LP4.

Referring further to FIG. 6, the support ring CS1_SP, the plurality of legs CS1_LP1, CS1_LP2, CS1_LP3 and CS1_LP4, and the camera mount CS1_CP may overlap the edge portions of the plurality of subsidiary lenses LS11, LS12, LS13, LS14, LS21, LS22, LS23 and LS24 when viewed from the top (or in a plan view) so that they are not seen by the user and allow most of the lights transmitting the subsidiary lenses LS11, LS12, LS13, LS14, LS21, LS22, LS23 and LS24 to pass therethrough. The lights passing through the center portions of the plurality of subsidiary lenses LS11, LS12, LS13, LS14, LS21, LS22, LS23 and LS24 may be incident on the user's pupils, while the lights passing through the edge portions of the plurality of subsidiary lenses LS11, LS12, LS13, LS14, LS21, LS22, LS23 and LS24 may be blocked or refracted so that they are not incident on the user's pupils.

The plurality of legs CS1_LP1, CS1_LP2, CS1_LP3 and CS1_LP4 may be arranged to overlap the plurality of lens boundaries in the third direction Z, respectively. Due to the refraction by the plurality of subsidiary lenses LS11, LS12, LS13, LS14, LS21, LS22, LS23 and LS24, lights passing through the plurality of lens boundaries are hardly incident on the user's eyes, and thus the plurality of legs CS1_LP1, CS1_LP2, CS1_LP3 and CS1_LP4 are not seen by the user. The plurality of lens boundaries may refer to particular portions or parallel regions adjacent to the edges of the respective subsidiary lens, in which lights passing therethrough are not seen by the user due to refraction of the lights by the multi-channel lenses.

The lights emitted from the first display device DP1 may pass between the plurality of legs CS1_LP1, CS1_LP2, CS1_LP3 and CS1_LP4 of the first camera mounting member CS1 and incident on the plurality of subsidiary lenses LS11, LS12, LS13 and LS14 of the first multi-channel lens LS1. A plurality of holes (spaces) may be formed between the plurality of legs CS1_LP1, CS1_LP2, CS1_LP3 and CS1_LP4 so that lights passing through the subsidiary lenses are not blocked. As shown in FIG. 6, the plurality of holes may be arranged to overlap the center portions of the plurality of subsidiary lenses LS11, LS12, LS13 and LS14, respectively. The area of the legs CS1_LP1, CS1_LP2, CS1_LP3 and CS1_LP4 may be smaller than the area of the holes therebetween when viewed from the top (or in a plan view). Likewise, the lights emitted from the second display device DP2 may pass between the plurality of legs CS1_LP1, CS1_LP2, CS1_LP3 and CS1_LP4 of the second camera mounting member CS1 and incident on the plurality of subsidiary lenses LS11, LS12, LS13 and LS14 of the second multi-channel lens LS2.

The number of the legs CS1_LP1, CS1_LP2, CS1_LP3 and CS1_LP4 may be equal to the number of the subsidiary lenses (channels) of the first multi-channel lens LS1. The number of the legs CS1_LP1, CS1_LP2, CS1_LP3 and CS1_LP4 may be less than the number of the subsidiary lenses (channels) of the first multi-channel lens LS1. The number of the legs CS1_LP1, CS1_LP2, CS1_LP3 and CS1_LP4 may be less than the number of the boundaries between the subsidiary lenses of the first multi-channel lens LS1. For example, when the first multi-channel lens LS1 has n subsidiary lenses, the first camera mounting member CS1 may have n or less legs. According to some embodiments of the present disclosure, the first multi-channel lens LS1 may have four subsidiary lenses (channels), and the first camera mounting member CS1 may have four legs, but embodiments according to the present disclosure are not limited thereto.

The first camera mount CS1_CP may include the first leg CS1_LP1 overlapping the first lens boundary BD1, the second leg CS1_LP2 overlapping the second lens boundary BD2, the third leg CS1_LP3 overlapping the third lens boundary BD3, and the fourth leg CS1_LP4 overlapping the fourth lens boundary BD4.

The camera mount CS1_CP and the first camera CMR1 may be arranged to overlap the center of the first multi-channel lens LS1 in the third direction Z. The camera mount CS1_CP and the first camera CMR1 may be arranged to overlap the contact point or intersection point of the plurality of lens boundaries when viewed from the top (or in a plan view). For example, as shown in FIG. 6, the camera mount CS1_CP and the first camera CMR1 may be arranged to overlap a cross-like intersection point formed by the plurality of lens boundaries when viewed from the top (or in a plan view).

Referring further to FIG. 7, the plurality of legs CS1_LP1, CS1_LP2, CS1_LP3 and CS1_LP4 may have a first width W1 which is so small that it is not seen by the user. The first width W1 may be measured in a direction crossing or perpendicular to the direction extended from the support ring CS1_SP of the legs toward the camera mount CS1_CP.

For example, the first width W1 may be approximately 3.0 mm or less. In this instance, the diameter of the first multi-channel lens LS1 may be approximately 30 mm to 60 mm. As another example, the first width W1 may be approximately $\frac{1}{13}$ to $\frac{1}{20}$ of the diameter of the first multi-channel lens LS1 when viewed from the top (or in a plan view). It should be noted that the size of the first width W1 is not limited thereto, and may be variously changed depending on the design of the optical device 1.

The camera mount CS1_CP may have a generally diamond shape when viewed from the top (or in a plan view). It should be understood that embodiments according to the present disclosure are not limited thereto. The camera mount CS1_CP may have a variety of shapes such as a rectangle, a square, a circle, an oval, and a trapezoid when viewed from the top (or in a plan view).

The camera mount CS1_CP may have a second width W2 greater than the first width W1 when viewed from the top (or in a plan view).

The second width W2 may be measured in a diagonal direction crossing the first direction X and the second direction Y. The second width W2 may be measured from the boundary between the first leg CS1_LP1 and the second leg CS1_LP2 to the boundary between the third leg CS1_LP3 and the fourth leg CS1_LP4, or from the boundary between the second leg CS1_LP2 and the third leg CS1_LP3 to the boundary between the first leg CS1_LP1 and the fourth leg CS1_LP4. The second width W2 may be greater than or equal to the width of the first camera CMR1.

For example, the second width W2 may be approximately 6.0 mm. In such case, the size of the first camera CMR1 may be approximately 5.0 mm×5.0 mm, and the diameter of the first multi-channel lens LS1 may be approximately 40 mm to 60 mm when viewed from the top (or in a plan view). As yet another example, the second width W2 may be approximately twice the first width W1. As another example, the second width W2 may be approximately ⅙ to 1/10 of the diameter of the first multi-channel lens LS1. It should be noted that the size of the second width W2, the size of the first camera CMR1, the diameter of the first multi-channel lens LS1, etc. are not limited thereto, and may vary depending on the design of the optical device 1.

Referring to FIGS. 2 and 3, like the first camera mounting member CS1, the second camera mounting member CS2 may also include a support ring CS2_SP, a plurality of legs CS2_LP1, CS2_LP2, CS2_LP3, CS2_LP4, and a camera mount CS2_CP.

Similar to that shown in FIG. 6, the support ring CS2_SP, the plurality of legs CS2_LP1, CS2_LP2, CS2_LP3 and CS2_LP4, the camera mount CS2_CP of the second camera mounting member CS2 and the second camera CMR2 may be arranged in substantially the same manner as the support ring CS1_SP, the plurality of legs CS1_LP1, CS1_LP2, CS1_LP3 and CS1_LP4, the camera mount CS1_CP of the first camera mounting member CS1 and the first camera CMR1.

The plurality of legs CS2_LP1, CS2_LP2, CS2_LP3 and CS2_LP4 of the second camera mounting member CS2 may be arranged to overlap the plurality of lens boundaries of the second multi-channel lens LS2, respectively. The plurality of legs CS2_LP1, CS2_LP2, CS2_LP3 and CS2_LP4 of the second camera mounting member CS2 may include the fifth leg CS2_LP1, the sixth leg CS2_LP2, the seventh leg CS2_LP3 and the eighth leg CS2_LP4 overlapping the fifth lens boundary BD5, the sixth lens boundary BD6, the seventh lens boundary BD7 and the eighth lens boundary BD8, respectively. The fifth leg CS2_LP1, the sixth leg CS2_LP2, the seventh leg CS2_LP3 and the eighth leg CS2_LP4 may have the width substantially equal to the width of the first leg CS1_LP1, the second leg CS1_LP2, the third leg CS1_LP3 and the fourth leg CS1_LP4, so that they are not seen by the user.

Likewise, the supporting ring CS2_SP and the camera mount CS2_CP of the second camera mounting member CS2 may also be arranged to overlap the edge portion of the second multi-channel lens LS2 and the center of the second multi-channel lens LS2, respectively, so that they are not seen by the user.

The optical device 1 has the symmetrical structure in accordance with a user's' both eyes, and the second multi-channel lens LS2, the second camera mounting member and the second camera CMR2 may be substantially identical to the first multi-channel lens LS1, the first camera mounting member CS1 and the first camera CMR1, respectively. Therefore, the first multi-channel lens LS1, the first camera mounting member CS1 and the first camera CMR1 will be mainly described.

Figure 8:
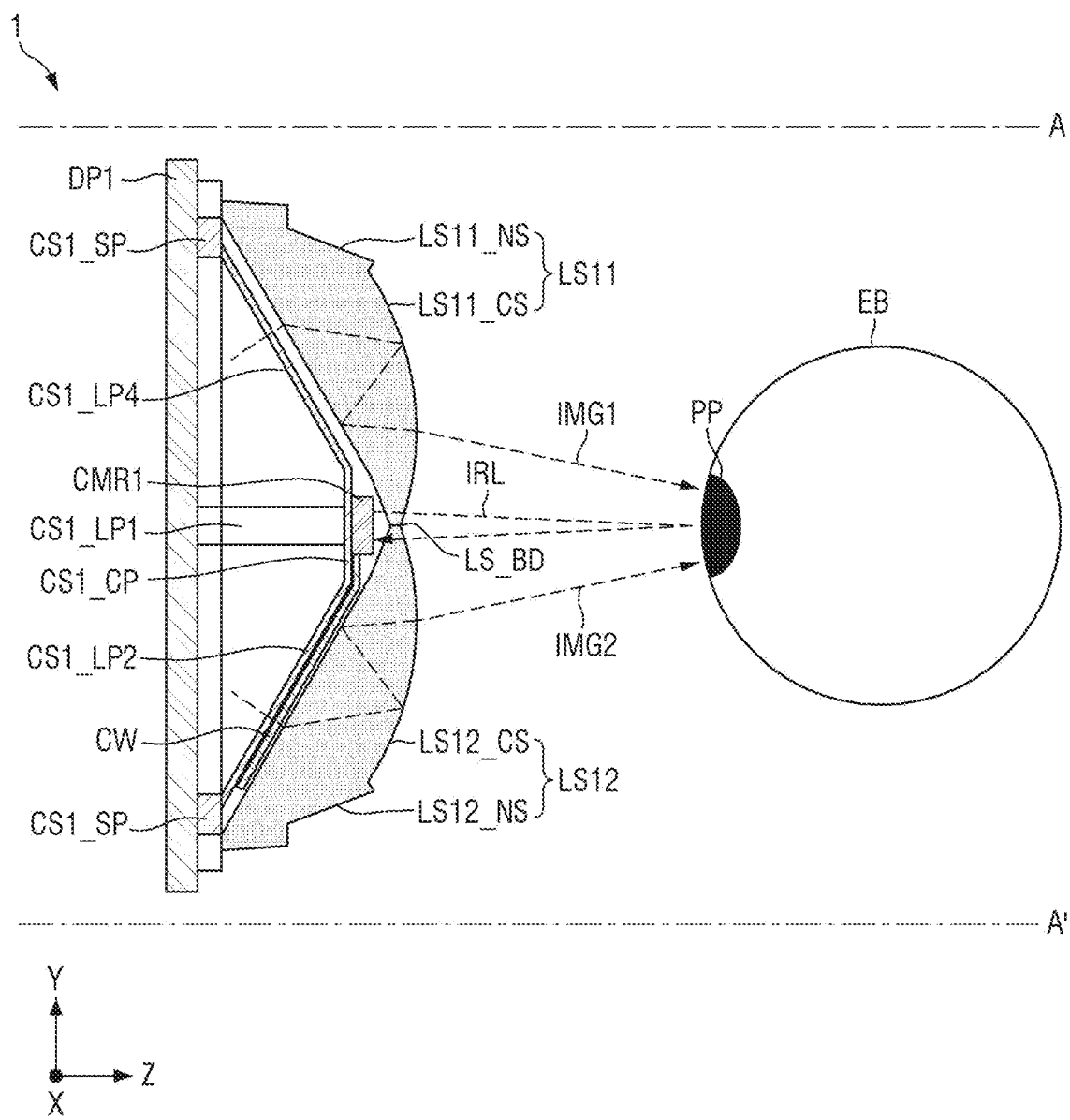
FIG. 8 is a cross-sectional view taken along the line A-A' of FIG. 3.

FIG. 8 is a cross-sectional view taken along the line A-A' of FIG. 3.

Referring to FIGS. 1 to 8, the first multi-channel lens LS1 may include a concave rear surface that faces the first display device DP1 and the first camera mounting member CS1. The rear surfaces of the plurality of subsidiary lenses LS11, LS12, LS13 and LS14 forming the first multi-channel lens LS1 may form the rear surface of the first multi-channel lens LS1. The rear surface of the first multi-channel lens LS1 may be the opposite surface of the eye-side surface (the second outer surface LS11_CS, the fourth outer surface LS12_CS, the sixth outer surface LS13_CS, and the eighth outer surface LS14_CS).

In cross section, between the rear surface of the first multi-channel lens LS1 and the support ring CS1_SP of the first camera mounting member CS1, a concave inner space having a generally triangular shape protruding toward the center of the first multi-channel lens LS1 can be formed. The plurality of legs CS1_LP1, CS1_LP2, CS1_LP3 and CS1_LP4 and the camera mount CS1_CP may be accommodated in the inner space.

As described above, the plurality of legs CS1_LP1, CS1_LP2, CS1_LP3 and CS1_LP4 of the first multi-channel lens LS1 may protrude from the support ring CS1_SP in the third direction Z. The legs CS1_LP1, CS1_LP2, CS1_LP3 and CS1_LP4 may be arranged such that they are spaced apart from the first multi-channel lens LS1 by a predetermined distance. The legs CS1_LP1, CS1_LP2, CS1_LP3 and CS1_LP4 may be arranged such that they are not in direct contact with the first multi-channel lens LS1. It should be understood that embodiments according to the present disclosure are not limited thereto. The legs CS1_LP1, CS1_LP2, CS1_LP3 and CS1_LP4 may be arranged such that they are in contact with the first multi-channel lens LS1.

As shown in FIG. 8, the second leg CS1_LP2 and the fourth leg CS1_LP4 may be spaced apart from the rear surface of the first multi-channel lens LS1 by a constant distance in the third direction Z. According to some embodiments, the first leg CS1_LP1 and the third leg CS1_LP3 may also be spaced apart from the rear surface of the first multi-channel lens LS1 by a constant distance in the third direction Z. For example, the first leg CS1_LP1, the second leg CS1_LP2, the third leg CS1_LP3 and the fourth leg CS1_LP4 may be spaced apart from the first multi-channel lens LS1 by approximately 1.0 mm. It should be understood that embodiments according to the present disclosure are not limited thereto.

The camera mount CS1_CP may overlap the center of the first multi-channel lens LS1 in the third direction Z and may be extended in the direction parallel to the first display device DP1 in cross section. As the rear surface of the first multi-channel lens LS1 has a concave shape, there is a concave internal space in which the first camera CMR1 can be accommodated between the camera mount CS1_CP and the first multi-channel lens LS1.

The first camera CMR1 may overlap the center of the first multi-channel lens LS1 in the third direction Z, and may be accommodated in the concave space between the camera mount CS1_CP and the rear surface of the first multi-channel lens LS1.

The camera mount CS1_CP may be arranged to form a space in which the first camera CMR1 can be accommodated between the center and adjacent portions of the first multi-channel lens LS1 and the camera mount CS1_CP.

The camera mount CS1_CP may be spaced apart from the rear surface of the first multi-channel lens LS1 in the third direction Z in cross section. The distance between the camera mount CS1_CP and the rear surface of the first multi-channel lens LS1 in the third direction Z may increase toward the center of the first multi-channel lens LS1. The distance between the camera mount CS1_CP and the rear surface of the first multi-channel lens LS1 may have the maximum value at the center of the first multi-channel lens LS1. The maximum distance between the camera mount CS1_CP and the rear surface of the first multi-channel lens LS1 may be equal to or greater than the thickness of the first camera CMR1 in the third direction Z. The maximum distance between the camera mount CS1_CP and the rear surface of the first multi-channel lens LS1 may be, but is not limited to, approximately 5.0 mm.

As described above, the plurality of subsidiary lenses LS11, LS12, LS13 and LS14 may provide a plurality of channels, respectively, through which the lights output from the first display device DP1 or the second display device DP2 pass. The subsidiary lenses may enlarge the lights emitted from particular regions of the first display device DP1 or the second display device DP2 with the same magnification or different magnifications. The lights passing through the subsidiary lens may include a partial image to realize a single complete VR image, and the lights may be focused on the user's pupils to provide a single complete VR image to the user.

For example, as shown in FIG. 8, lights output from different regions of the first display device DP1 may pass through the first multi-channel lens LS1 through different paths. The first subsidiary lens LS11 may provide a channel through which light IMG1 output from a region of the first display device DP1 (e.g., the upper end of the first display device DP1 of FIG. 8) passes. The second subsidiary lens LS12 may provide a channel through which light IMG2 output from another region of the first display device DP1 (e.g., the lower end of the first display device DP1 of FIG. 8) passes. At least a part of a region of the first display device DP1 may include a region at least partially overlapping the first subsidiary lens LS11 in the third direction Z, and at least a part of another region of the second display device DP2 may include a region at least partially overlapping the second subsidiary lens LS12 in the third direction Z. According to some embodiments, the third subsidiary lens LS13 and the fourth subsidiary lens LS14 may also provide channels through which lights emitted from particular regions of the first display device DP1 pass. According to some embodiments of the present disclosure, light passing through each of the subsidiary lenses LS11, LS12, LS13 and LS14 may be refracted twice and reflected twice and then may be provided to the user. It should be understood that embodiments according to the present disclosure are not limited thereto.

According to some embodiments of the present disclosure, a light source for measuring the user's pupil may be incorporated into the first camera CMR1. The light IRL output from the first camera CMR1 may be reflected off the user's pupil to be incident on the first camera CMR1. The light IRL may include an image or a pattern including the user's pupil. Based on the light IRL received by the first camera CMR1, the position of the user's pupil and the user's gaze direction may be calculated. As the light source is integrated into the first camera CMR1, the overall volume of the optical device 1 is reduced, so that a compact optical device 1 can be implemented. According to some embodiments of the present disclosure, the light source may be implemented separately from the first camera CMR1, and may be mounted on the camera mount CS1_CP adjacent to the first camera CMR1.

Referring to FIG. 8, the optical device 1 may further include a camera connection wire CW connected to the first camera CMR1.

The camera connection wire CW may be located on the first camera mounting member CS1. The camera connection wire CW may be located between the first camera mounting member CS1 and the first multi-channel lens LS1 in cross section. The camera connection line CW may be located on the camera mount CS1_CP and at least one of the plurality of legs CS1_LP1, CS1_LP2, CS1_LP3, or CS1_LP4. For example, as shown in FIG. 8, the camera connection wire CW may be located on the second leg CS1_LP2, but embodiments according to the present disclosure are not limited thereto. The camera connection wire CW may be located on the first leg CS1_LP1, the third leg CS1_LP3 or the fourth leg CS1_LP4.

The camera connection wire CW may be located on a surface of the camera mount CS1_CP facing the first multi-channel lens LS1 and a surface of at least one of the plurality of legs CS1_LP1, CS1_LP2, CS1_LP3 or CS1_LP4. According to some embodiments, the camera connection wire CW may be located on the other surface of the camera mount CS1_CP facing the first display device DP1 and the other surface of at least one of the plurality of legs CS1_LP1, CS1_LP2, CS1_LP3 or CS1_LP4. The other surface of the camera mount CS1_CP and the other surface of at least one of the plurality of legs CS1_LP1, CS1_LP2, CS1_LP3 or CS1_LP4 may be opposite to the surface of the camera mount CS1_CP and the surface of at least one of the plurality of legs CS1_LP1, CS1_LP2, CS1_LP3 or CS1_LP4.

As described above, the second multi-channel lens LS2, the second camera mounting member, and the second camera CMR2 are substantially identical to the first multi-channel lens LS1, the first camera mounting member CS1 and the first camera CMR1, respectively; and, therefore, some redundant descriptions will be omitted.

Figure 9:
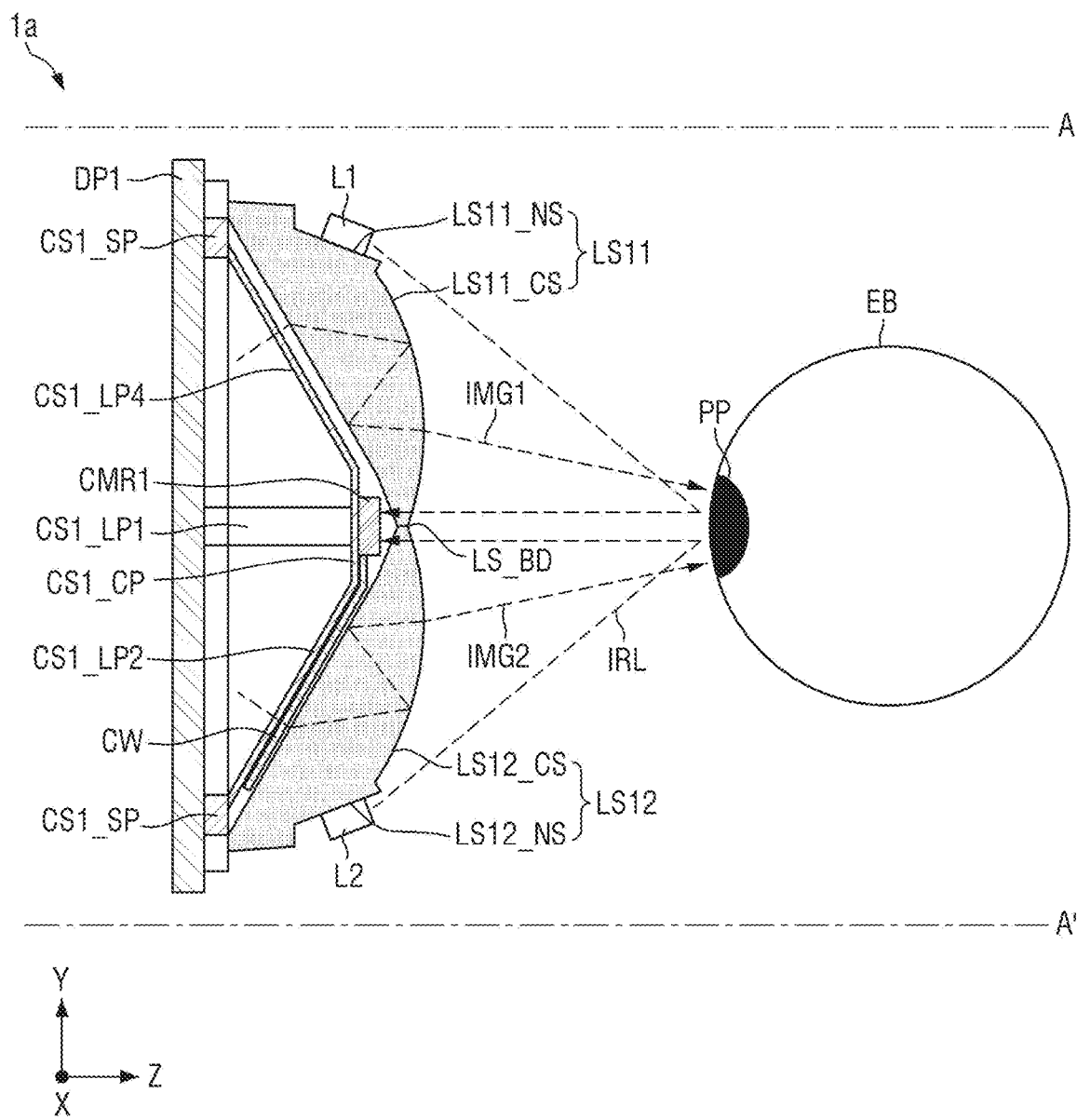
FIG. 9 is a cross-sectional view of an optical device according to some embodiments of the present disclosure.

FIG. 9 is a cross-sectional view of an optical device according to some embodiments of the present disclosure.

The embodiments described with respect to FIG. 9 varies from the embodiments described with respect to FIGS. 1 to 8 in that light sources LS1 and LS2 are located on the outer surfaces of the first multi-channel lens LS1.

Referring to FIG. 9, the optical device 1 may include a first light source LS1 located on the outer surface of the first multi-channel lens LS1 and emitting light toward the user's pupil. In this instance, the light sources incorporated into the first camera CMR1 and the second camera CMR2 may be eliminated, but embodiments according to the present disclosure are not limited thereto.

Referring to FIGS. 3 and 4, the first light source LS1 may be located on one of the first outer surface LS11_NS, the third outer surface LS12_NS, the fifth outer surface LS13_NS and the seventh outer surface LS14_NS. For example, as shown in FIG. 9, the first light source LS1 may be located on the first outer surface LS11_NS of the first subsidiary lens LS11, but embodiments according to the present disclosure are not limited thereto. As the first light source LS1 is located on the first outer surface LS11_NS, the light passing through the second outer surface LS11_CS is not blocked and the user's gaze is not obstructed.

The optical device 1 may further include the second light source LS which is located on the other subsidiary lenses LS11, LS12, LS13 and LS14 than the subsidiary lenses LS11, LS12, LS13 and LS14 on which the first light source LS1 is located. That is to say, the optical device 1 may include a plurality of light sources LS1 and LS2.

The second light source LS2 may be located on one of the first outer surface LS11_NS, the third outer surface LS12_NS, the fifth outer surface LS13_NS and the seventh outer surface LS14_NS. For example, as shown in FIG. 9, the second light source LS2 may be located on the third outer surface LS12_NS of the second subsidiary lens LS12, but embodiments according to the present disclosure are not limited thereto. By further arranging the second light source LS2, it may be possible to detect the position of the user's pupil more accurately.

Unlike the embodiments described with respect to FIGS. 1 to 8, as the first light source LS1 and the second light source LS2 are located on the first multi-channel lens LS1, distortion of the light IRL can be reduced, and the sizes of the first camera CMR1 and the camera mount CS1_CP can be reduced.

The first light source LS1 and the second light source LS2 may emit light IRL for detecting the position of the user's pupil. The light IRL emitted from the first light source LS1 and the second light source LS2 may be reflected off the user's pupil to be incident on the first camera CMR1. The light IRL may be, but is not limited to, infrared or visible light. Based on the light IRL received by the camera, the position of the user's pupil and the user's gaze direction may be calculated.

Although two light sources LS1 and LS2 are shown as the plurality of light sources LS1 and LS2 in the example shown in FIG. 9, the number of light sources LS1 and LS2 is not limited thereto. According to some embodiments, three or more light sources LS1 and LS2 may be located in the first multi-channel lens LS1. According to some embodiments, the second light source LS2 may be eliminated, and only one first light source LS1 may be located in the first multi-channel lens LS1.

The embodiments described with respect to FIG. 9 are substantially identical to the embodiments described with respect to FIGS. 1 to 8 except that the light sources LS1 and LS2 are located on the outer surfaces of the first multi-channel lens LS1; and, therefore, some redundant descriptions will be omitted.

Figure 10:
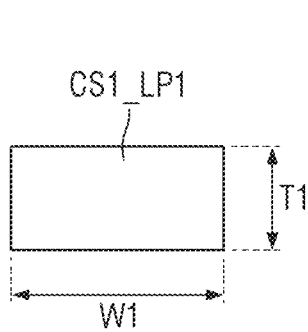
FIG. 10 shows various cross-sectional views of first legs according to some embodiments of the present disclosure.
Figure 10:
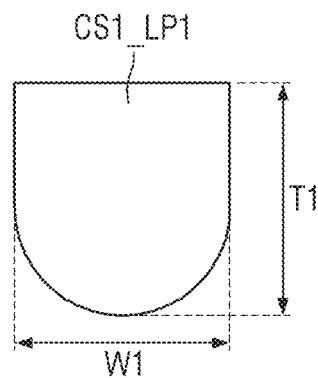
Figure 10:
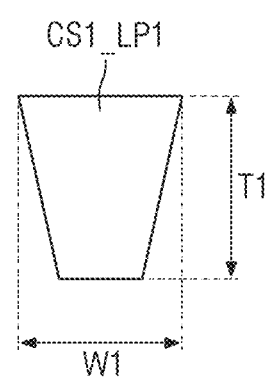

FIG. 10 shows various cross-sectional views of first legs according to some embodiments.

Referring to FIGS. 1 to 10, the cross-sectional shape of the plurality of legs CS1_LP1, CS1_LP2, CS1_LP3 and CS1_LP4 of the first camera mounting member CS1 may be substantially identical or similar to the cross-sectional shape of the plurality of legs CS2_LP1, CS2_LP2, CS2_LP3 and CS2_LP4 of the second camera mounting member CS2. Hereinafter, the cross-sectional shapes of the first legs CS1_LP1 will be described.

Referring to FIG. 10(a), the first leg CS1_LP1 may have a rectangular shape in cross-section. The first width W1 of the first leg CS1_LP1 may be greater than the first thickness T1 of the first leg CS1_LP1 in the third direction Z. According to some embodiments, the first width W1 may be equal to the first thickness T1. The first leg CS1_LP1 may have flat upper and lower surfaces. Accordingly, the camera connection wire CW may be easily located on the upper surface or the lower surface of the first leg CS1_LP1. For example, the first thickness T1 may be, but is not limited to, approximately 1.0 mm.

Referring to FIG. 10(b), the first width W1 may be smaller than the first thickness T1. In this instance, the secondary moment of the first leg CS1_LP1 in cross section can increase more in the example shown in FIG. B than in the example shown in FIG. 10(a). The first leg CS1_LP1 may have a flat upper surface and a convex lower surface. For example, the first thickness T1 may be, but is not limited to, approximately 3.0 mm.

Referring to FIG. 10(c), the first width W1 may be smaller than the first thickness T1, and the first leg CS1_LP1 may have a tapered cross-sectional shape in which the width in the horizontal direction decreases toward the bottom. In this instance, the first width W1 may refer to the maximum width of the first leg CS1_LP1, i.e., the width of the upper surface of the first leg CS1_LP1. The side surface between the upper surface and the lower surface of the first leg CS1_LP1 may be inclined with respect to the third direction Z. The width of the upper surface of the first leg CS1_LP1 in the horizontal direction may be substantially equal to the first width W1, and the width of the lower surface of the first leg CS1_LP1 in the horizontal direction may be smaller than the first width W1.

Each of the plurality of legs CS1_LP1, CS1_LP2, CS1_LP3 and CS1_LP4 of the first camera mounting member CS1 and the plurality of legs CS2_LP1, CS2_LP2, CS2_LP3 and CS2_LP4 of the second camera mounting member CS2 may have the same cross-sectional shape as one of the cross-sectional shape shown in FIG. 10. The cross-sectional shape of the plurality of legs CS1_LP1, CS1_LP2, CS1_LP3 and CS1_LP4 of the first camera mounting member CS1 and the cross-sectional view shape of the plurality of legs CS2_LP1, CS2_LP2, CS2_LP3 and CS2_LP4 of the second camera mounting member CS2 are not limited thereto but may vary depending on the design of the optical device 1. According to some embodiments, at least one of the plurality of legs CS1_LP1, CS1_LP2, CS1_LP3, CS1_LP4, CS2_LP1, CS2_LP2, CS2_LP3 or CS2_LP4 may have a different cross-sectional shape from the others.

Figure 11:
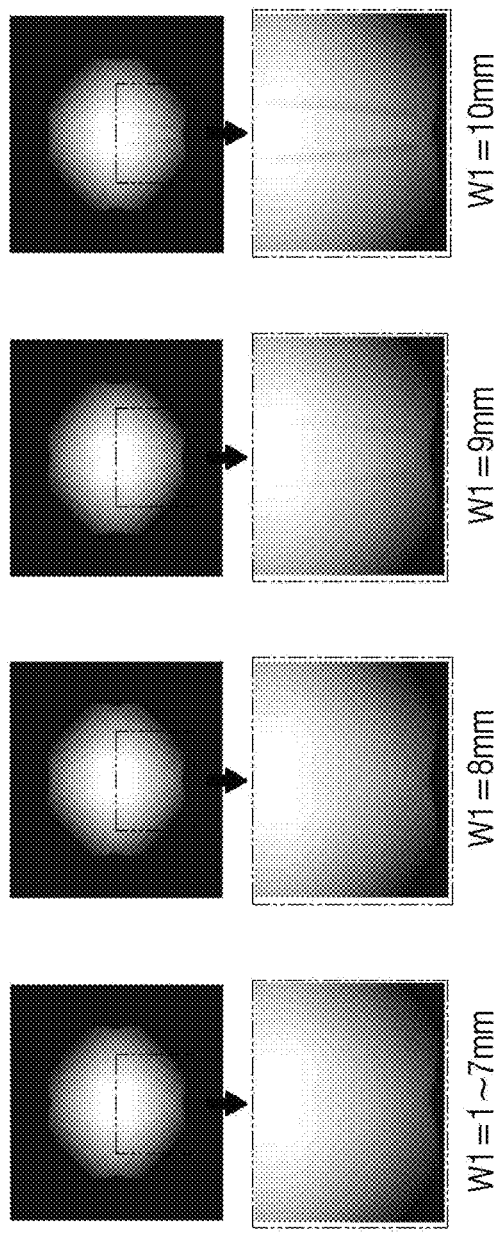
FIG. 11 shows photographs showing the results of visibility test of the camera mounting member for different widths of the legs.
Figure 12:
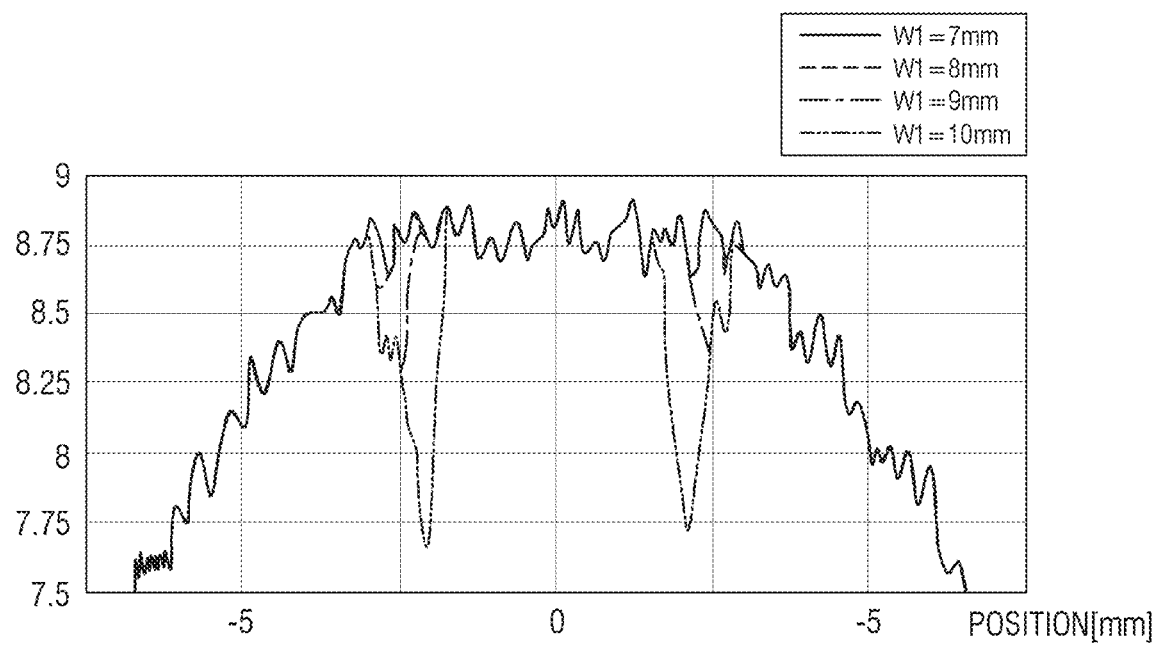
FIG. 12 is a graph showing the results of the visibility test of the camera mounting member for different widths of the legs.
Figure 13:
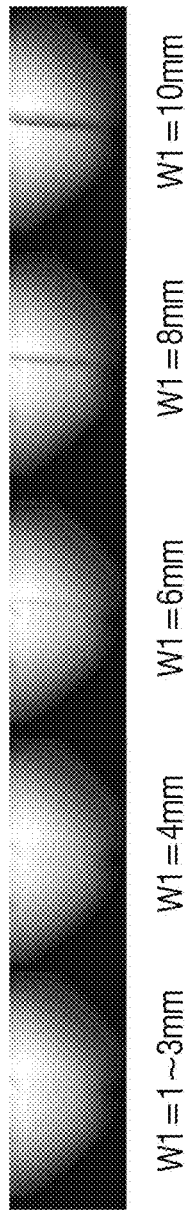
FIG. 13 is a photograph showing the results of visibility test of the camera mounting member for different widths of the legs when a user rotated the eyeball.
Figure 14:
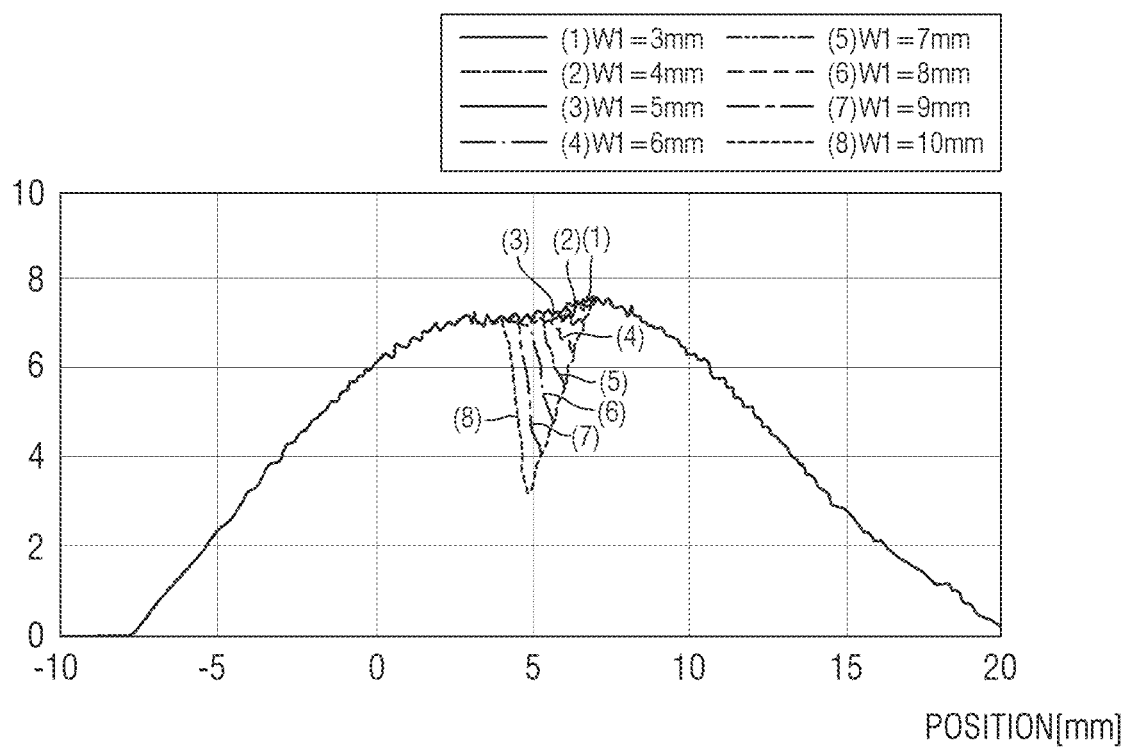
FIG. 14 is a graph showing the results of visibility test of the camera mounting member for different widths of the legs when a user rotated the eyeball.

FIG. 11 shows photographs showing the results of visibility test of the camera mounting member for different widths of the legs. FIG. 12 is a graph showing the results of the visibility test of the camera mounting member for different widths of the legs. FIG. 13 is a photograph showing the results of visibility test of the camera mounting member for different widths of the legs when a user rotated the eyeball. FIG. 14 is a graph showing the results of visibility test of the camera mounting member for different widths of the legs when a user rotated the eyeball.

FIG. 11 shows test images taken on the assumption that the user's eye gazes at the center of the first multi-channel lens LS1. FIG. 12 shows the amount of light according to the position (distance) from the center of the first multi-channel lens LS1.

The following test results were obtained under the conditions that the diameter of the first multi-channel lens LS1 was approximately 45 mm, the first thickness T1 was approximately 1.0 mm, and the dimensions of the camera were 5.0 mm by 5.0 mm.

Referring to FIG. 11, when the first width W1 is approximately 1 mm to 7 mm, in the test image, the first camera mounting member CS1, for example, one of the legs CS1_LP1, CS1_LP2, CS1_LP3 and CS1_LP4 of the first camera mounting member CS1 is not seen. When the first width W1 is approximately 8 mm to 9 mm, the first camera mounting member CS1 is faintly seen in the test image. When the first width W1 is approximately 10 mm, the first camera mounting member CS1 is relatively clearly seen in the test image. That is to say, when the first width W1 is 8 mm or more, the first camera mounting member CS1 is seen by the user.

Referring to FIG. 12, the horizontal axis of the graph represents the position (distance) from the center of the first multi-channel lens LS1, and the vertical axis of the graph represents the relative size of the amount of light.

In the following description, the particular position range (particular distance range) may refer to the range in which the plurality of legs CS1_LP1, CS1_LP2, CS1_LP3 and CS1_LP4 of the first camera mounting member CS1 is located with respect to the center of the first multi-channel lens LS1. For example, in the example shown in FIG. 12, the particular position range may be spaced apart from the center of the first multi-channel lens LS1 by approximately 2.0 mm to 3.0 mm and −2.0 mm to −3.0 mm.

When the first width W1 is approximately 7 mm, the amount of light measured in the particular position range is approximately 8.625 to 8.875, which has a value similar to the amount of light measured around it. When the first width W1 is approximately 8 mm, the amount of light measured in a particular position range is generally similar to that when the first width W1 is approximately 7 mm, but may be slightly less than that when the first width W1 is approximately 7 mm. When the first width W1 is approximately 9 mm, the amount of light measured at a particular position range is approximately 8.3 to 8.8, which is significantly smaller than that when the first width W1 is approximately 7 mm or 8 mm. When the first width W1 is approximately 10 mm, the amount of light measured in the particular position range is approximately 7.6 to 8.8, which is much smaller than other examples. That is to say, it can be seen that when the first width W1 is approximately 7 mm or more, the light is blocked by the plurality of legs CS1_LP1, CS1_LP2, CS1_LP3 and CS1_LP4 of the first camera mounting member CS1, and the first camera mounting member CS1 is seen by the user.

FIG. 13 shows a test image taken on the assumption that the user's eyeball is rotated by approximately 15° with respect to the center of the first multi-channel lens LS1. FIG. 14 shows the amount of light according to the position (distance) from the center of the first multi-channel lens LS1.

Referring to FIG. 13, when the first width W1 is approximately 1.0 mm to 3.0 mm, the first camera mounting member CS1 is hardly seen in the test image. Similarly, when the first width W1 is approximately 4.0 mm, the first camera mounting member CS1 is hardly seen or very faintly seen in the test image. When the first width W1 is 6.0 mm or more, the first camera mounting member CS1 is seen in the test image. When the first width W1 is 8.0 mm or more, the first camera mounting member CS1 is seen clearly in the test image. That is to say, unlike the example shown in FIG. 11, when the first width W1 is 4.0 mm or more, the first camera mounting member CS1 is seen by the user.

Referring to FIG. 14, the horizontal axis of the graph represents the position (distance) from the center of the first multi-channel lens LS1, and the vertical axis of the graph represents the relative size of the amount of light. In the example shown in FIG. 14, the above particular position range may refer to a position range spaced apart from the center of the first multi-channel lens LS1 by approximately 2.5 mm to 7.5 mm.

When the first width W1 is approximately 3 mm, the amount of light measured in the particular position range is approximately 7.0 to 7.5, which has a value similar to the amount of light measured around it. On the other hand, when the first width W1 is approximately 4 mm or more, the amount of light measured in the particular position range is significantly lower than that when the first width W1 is approximately 3 mm. As the first width W1 increases, the minimum value of the amount of the light measured in the position range decreases. That is to say, when the first width W1 is approximately 4 mm or more, the light is blocked by the plurality of legs CS1_LP1, CS1_LP2, CS1_LP3 and CS1_LP4 of the first camera mounting member CS1, and the first camera mounting member CS1 is seen by the user is recognized.

However, the aspects of the present disclosure are not restricted to those explicitly set forth herein. The above and other aspects of the present disclosure will become more apparent to one of daily skill in the art to which the present disclosure pertains by referencing the claims, with equivalents thereof to be included therein.

What is claimed is:

1. An optical device comprising:
    a display device configured to display an image;
    a camera mounting component on the display device;
    a camera on the camera mounting component; and
    a multi-channel lens on the camera covering the camera and the camera mounting component,
    wherein the camera comprises an image sensor, and
    wherein the camera mounting component comprises a support ring, a plurality of legs connected to the support ring, and a camera mount connected to the plurality of legs.

2. The optical device of claim 1, wherein the plurality of legs and the camera mount are on an inner side of the support ring in a plan view.

3. The optical device of claim 2, wherein one side of each of the plurality of legs is connected to the support ring, and an opposite side of each of the plurality of legs is connected to the camera mount.

4. The optical device of claim 1, wherein the plurality of legs and the camera mount protrude from the support ring toward the multi-channel lens.

5. The optical device of claim 1, further comprising:
    a camera connection wire on one of the plurality of legs and connected to the camera.

6. The optical device of claim 1, wherein the camera mount overlaps a center of the multi-channel lens in a plan view.

7. The optical device of claim 1, wherein the camera is between the camera mount and the multi-channel lens.

8. The optical device of claim 7, wherein the multi-channel lens comprises a concave rear surface facing the display device, and wherein the camera is in a space between the rear surface of the multi-channel lens and the camera mount.

9. The optical device of claim 1, wherein the multi-channel lens comprises a plurality of subsidiary lenses providing a plurality of channels, respectively, and wherein the legs overlap boundaries between the subsidiary lenses, respectively.

10. The optical device of claim 9, wherein the subsidiary lenses are configured to refract and reflect lights output from different regions of the display device, respectively.

11. The optical device of claim 10, wherein a number of the plurality of legs is equal to or less than a number of the plurality of subsidiary lenses.

12. The optical device of claim 10, wherein the light output from the display device passes between the plurality of legs.

13. The optical device of claim 1, wherein the camera comprises a light source configured to emit light.

14. The optical device of claim 13, wherein the camera is configured to receive light that is emitted from the light source and reflected off a pupil of a user.

15. The optical device of claim 1, further comprising:
a light source configured to emit light, wherein the light source is on an outer surface of the multi-channel lens.

16. The optical device of claim 1, wherein a controller of the optical device is configured to detect a position of a pupil of a user based on a plurality of images captured by the camera.

17. An optical device comprising:
a display device configured to display an image;
a multi-channel lens above the display device and comprising a front surface facing an eye of a user and a concave rear surface facing the display device;
a camera mounting component at least partially accommodated in an internal space between the rear surface of the multi-channel lens and the display device; and
a camera on the camera mounting component to face the rear surface of the multi-channel lens.

18. The optical device of claim 17, wherein the camera mounting component comprises a support ring, a plurality of legs connected to the support ring, and a camera mount connected to the plurality of legs.

19. The optical device of claim 18, wherein the multi-channel lens comprises a plurality of subsidiary lenses providing a plurality of channels, respectively, and wherein the legs overlap boundaries between the subsidiary lenses, respectively.

* * * * *